Dec. 27, 1949 L. W. MUELLER 2,492,494
METER CONNECTION
Filed Sept. 5, 1947 2 Sheets-Sheet 1
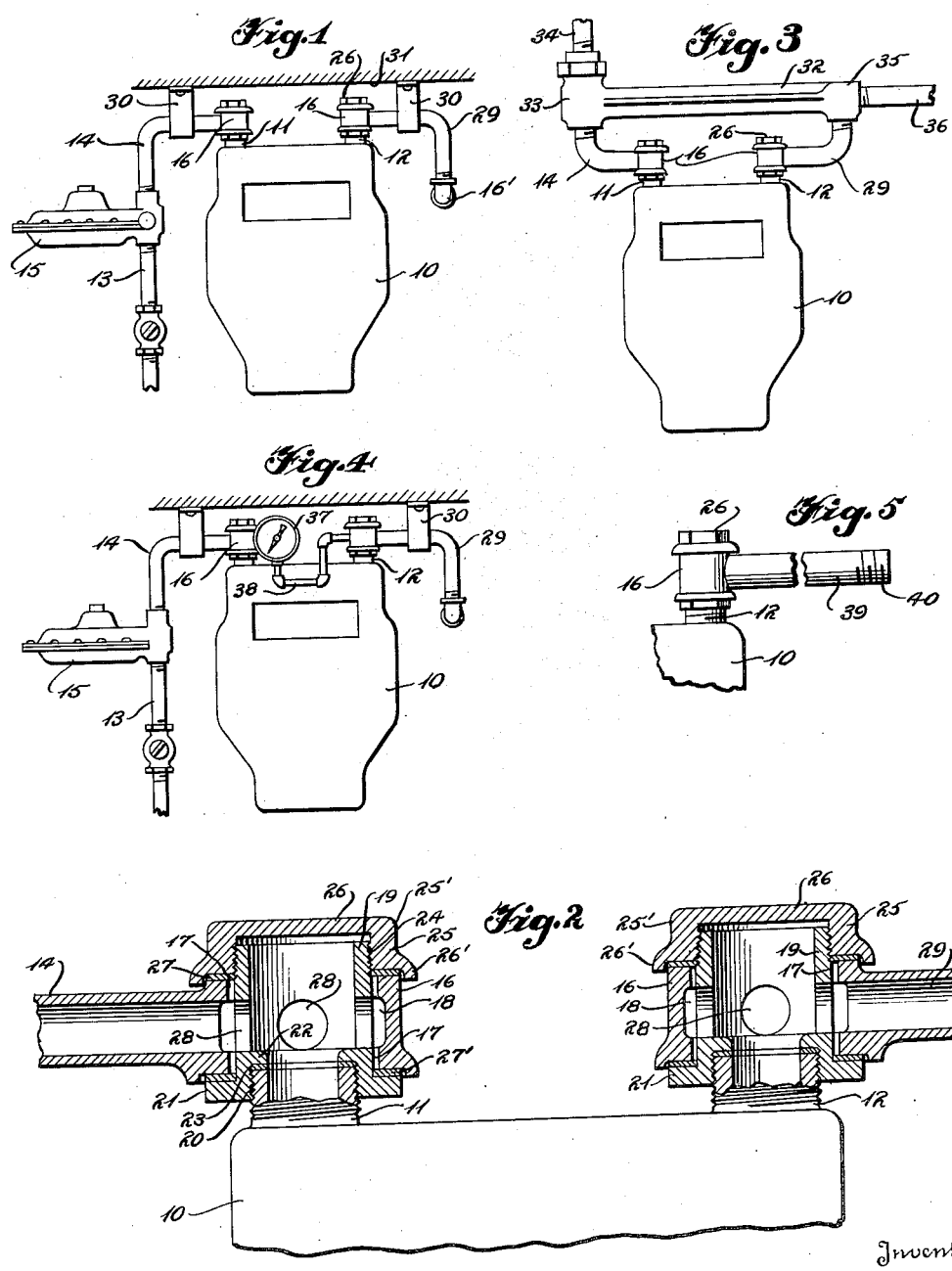
Inventor
Lucien W. Mueller
By Cushman Darby Cushman
Attorneys

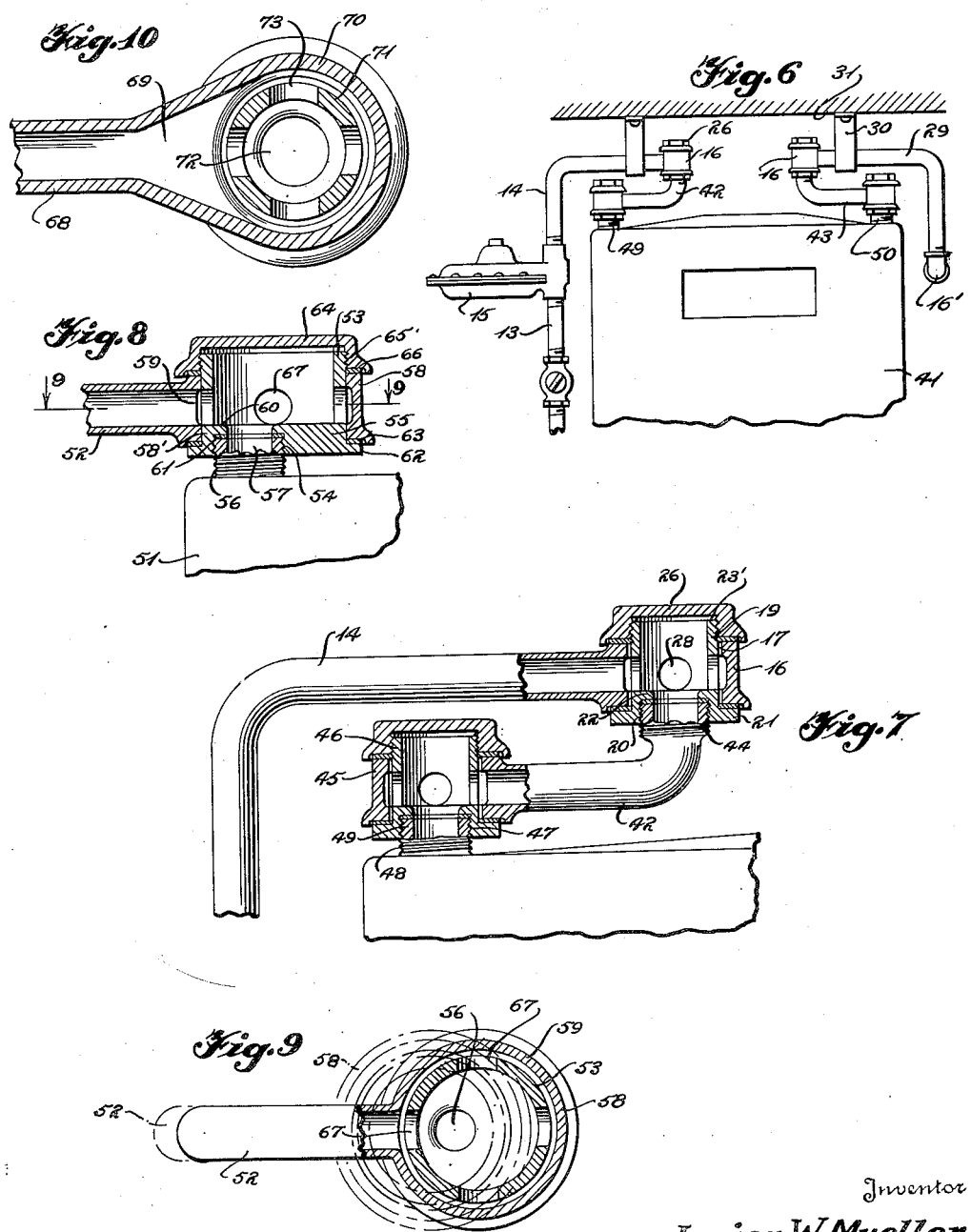

Patented Dec. 27, 1949

2,492,494

UNITED STATES PATENT OFFICE 2,492,494

METER CONNECTION

Lucien W. Mueller, Decatur, Ill., assignor to Mueller Co., Decatur, Ill., a corporation of Illinois Application September 5, 1947, Serial No. 772,299

4 Claims. (Cl. 285—3)

The present invention relates to an improved connecting means for gas meters and the like.

An important object of the invention is to provide means in the form of a tubular adapter interposed between the connector and the spud of a cast iron or tin meter, and which is interchangeable with similarly formed adapters having variations only in their spud threads so as to provide simple, efficient and positive means which will fit both cast iron and tin meters and can be used in setting either a cast iron meter or a tin meter in place or substituting one type for the other.

In building houses, particularly in warm localities, it is a common practice to omit basements with the result that it is necessary to install the gas meter under the floor which has very little headroom between the floor and the ground. The plumbers in roughing-in the gas service pipes usually run the inlet pipe under the house, through a wall, if there is one, and up to a point near where the meter is to be installed, usually not knowing whether a cast iron meter or a tin meter is to be used. The actual installation usually occurs sometime after the roughing-in has been done and the workman who installs the meter may have either one or both types of meters available. While tin meters are standardized, the manufacturers of cast iron meters have not as yet standardized the threads on the spuds of the meter. Consequently, a nominal or common size spud, for example, of ¾ inch diameter, may have several variations in threads so that a retaining member or coupling nut for one will not fit the other of the threaded spuds on the meter. Moreover, there is an increased use of cast iron meters in which the coupling spuds are much closer together than those on the old style so-called tin meters. It is now a common practice for gas companies to remove a tin meter from service and install a cast iron meter in its place. It also frequently happens that a cast iron meter is removed and replaced by a tin meter. This is due to the fact that as long as tin meters can be repaired and replaced in service it is economical to use them.

Accordingly, in order to provide a meter connecting means which may efficiently be used in setting up both cast iron and tin meters, an adapter of uniform design is provided which will fit either cast iron or tin meters, and which is interchangeable with a similarly formed adapter having differently threaded spuds so that the connector may be used with cast iron meters whose spud threads have not been standardized and also with tin meters, and which also may be used in setting either type of meter in place of the other at a minimum expenditure of time and effort.

Other objects and advantages of the invention will become apparent from the following description when taken in conjunction with the accompanying claims and drawings.

Referring to the drawings in which are shown several preferred embodiments the invention may assume:

Figure 1 is a front view of the connecting means applied to a cast iron meter.

Figure 2 is a view similar to Figure 1 showing the inlet and outlet spuds of the meter and their associated parts in vertical sections.

Figure 3 is a front view showing the meter connection associated with a horizontal meter bar for installing a cast iron meter.

Figure 4 is a front view of the connecting means shown in Figure 1 and provided with means for connecting one of the adapters to a pressure gage.

Figure 5 shows the connecting means associated with a meter spud but having a straight instead of a bent connection.

Figure 6 is a front view of a modified form of meter connection showing the combination of two pairs of the connecting means installed on a tin meter and without using a rigid meter bar.

Figure 7 is a detailed side view with parts in section of one of the meter connections shown in Figure 6.

Figure 8 is a vertical sectional view of a modified meter connection in which the adapter is eccentric with respect to the spud so as to provide adjusting means to compensate for inaccuracies in roughing-in the service pipes.

Figure 9 is a sectional view taken substantially along the line 9—9 of Figure 8 and showing in dotted lines the different adjusted positions assumed by the adapter relative to the meter, and Figure 10 is a sectional view of a modified form of connector provided with a flaring passage for maintaining open communication between the interior of the connector and the adapter.

Referring to the drawings, and more particularly, Figures 1 and 2, 10 designates a cast iron gas meter having spaced externally threaded spuds 11 and 12, one of which such as 11 constitutes the inlet receiving spud and the other the outlet spud. The spud 11 communicates with the inlet service pipe 13 through an elbow pipe connector 14. Between the pipes 13 and 14 may be interposed a pressure regulator 15.

The tubular connector 14 terminates at one end in the horizontally disposed enlarged head 16 (Fig. 2) having a vertical through-opening 17 formed intermediate its ends with an enlarged annular passage or chamber 18. A tubular adapter 19 is internally threaded adjacent its lower or coupling end as at 20 so as to be detachably connected to the spud 11, and has an external flange 21, preferably of polygonal shape, so as to receive a wrench or tool for screwing the adapter 19 onto the spud 11 or for removing the same therefrom. The head 16 of the connector 14 fits over the adapter 19 and the opening 17 is of somewhat larger diameter than the external diameter of the adapter so that the latter is capable of lateral adjustment in any direction, if the service pipes are inaccurately roughed-in. The adapter 19 immediately above the threaded portion 20 is provided with an internal annular stop flange 22 for forming a joint with the upper end of the spud 11 and which serves to limit the distance the spud extends into the adapter. Preferably a gasket 23 is positioned between the spud 11 and the flange 22 to insure a tight seal being formed when the adapter is applied to the spud. The upper end of the adapter 19 is externally threaded as at 24 so as to receive internal complementary threads on the skirt 25 of a cap or retaining member 26, so that upon the connector being fitted onto the adapter 19 and the cap 26 threaded on the adapter, the head 16 of the connector 14 is clamped between the supporting flange 21 and the skirt 25 of the cap 26. Preferably a gasket 27 is interposed between the head 16 and the skirt 25 so as to co-act with a gasket 27' between the flange 21 and the bottom of the head 16 in order to provide a tight seal for preventing the escape of gas from the adapter. The skirt 25 of the cap 26 may be provided externally with a polygonal-shaped upper portion 25' for receiving a suitable tool in order to apply or remove the cap, and a lower enlarged end or flanged portion 26' that overlaps the head 16 when the parts are assembled. While the diameter of the opening 17 in the head 16 is such as to loosely mount the connector 14 on the adapter, it will be manifest that the cross sectional shape of the adapter and the head 16 which preferably are shown cylindrical to permit wide angular adjustment, may be of any suitable polygonal shape so that when the head is slipped over the adapter it will be non-rotatably positioned thereon even before the cap 26 is threaded down on the adapter. The adapter 19 is preferably provided with spaced circumferentially disposed ports or openings 28 which register with the annular passage or chamber 18 in the head 16. The outlet connector 29 and its associated adapter and spud 12 are identical in construction and operation to the inlet adapter 14 and its associated parts, and are designated by the same numerals as their corresponding parts associated with the inlet connector 14. The outlet connector 29 is connected to the outlet service pipe 16' (Fig. 1) and the meter assembly is preferably supported by means of spaced hanger straps 30 to the underside of the floor 31 so as to take up only a limited amount of space. The gas from the service pipe 13 passes through the connector 14 and enters the meter 10 through the passage 18 and openings 28 and is withdrawn from the meter thru the spud 12 and discharges from the connector 29 into the service pipe 16.

For all designs of gas meters having a certain nominal size inlet and outlet spud, the diameter of each of the adapters 19 is uniform. As the internal screw threads 20 of the adapter must fit the external threads of the spud of the individual meter to be installed, the gas company will keep on hand a supply of these adapters having several variations in coupling threads which will fit the spud threads of any cast iron or tin meter having a nominal or common size spud.

When installing a cast iron meter 10, two adapters 19 are initially selected having the correct size internal coupling threads 20, which may be indicated by a number or letter stamped or fixed on the adapters. One of these adapters is then screwed onto the inlet spud 11 and the other onto the outlet spud 12 and a tight seal is provided by the annular gaskets 23. The elbow connectors 14 and 29 are next connected to the service pipes 13 and 16 respectively, and the meter 10 lifted until the adapters 19 enter the openings 17 in the connectors 14 and 29 so as to rest against the gasket 27' on the flange 21. Then the gaskets 27 are slipped over the adapters and the caps 26 screwed on the upper ends of the adapters. The vertical openings 17 provide a space between the outer wall of each of the adapters 19 and the head 16 so as to permit considerable lateral adjustment in any direction in order that the service pipes will not have to be sprung or forced to permit the adapters to enter the openings 17. Any necessary angular adjustment of the connectors 14 and 29 may be made before the caps 26 are tightened on their associated adapters. It will be seen from Figure 1 that the use of this improved connecting means enables the meter to be installed with its upper end close to the floor and be mounted in a limited space, thus providing a maximum amount of headroom.

In Figure 3 the cast iron meter 10 and the connecting means are substantially similar to the form of invention previously described with the exception that the elbow connectors 14 and 29 which have their inner ends terminating in head 16 that fit on the threaded spuds 11 and 12, are shown having their outer ends connected to a horizontal meter bar 32 which at one end is provided with an enlarged body portion 33 that is threadedly connected to the outer end of the elbow 14 and to an inlet service pipe 34. The outer end of the elbow 29 communicates with a chamber 35 in the opposite end of the meter bar to which is connected the outlet service pipe 36.

In Figure 4 the meter connection is substantially similar to that shown in Figure 1 and additionally includes the association of a pressure gage 37 with the head 16 of the connector 29, preferably by tapping the side of the head 16 and its associated adapter 19 so as to connect one end of a pipe 38 to the adapter, and the opposite end of the pipe to the gage 37 in order not to take up much headroom and allow the meter to be positioned near the floor.

In the form of the invention shown in Figure 5 the connecting means is similar to that previously described with the exception that instead of using an elbow connector, a straight connector 39 is provided having an enlarged head 16 similar to the head previously described, which fits over an adapter threaded to a spud 12 of the meter 10 in a manner similar to the connection shown in Figure 2. The opposite end of the straight connector or pipe 39 may be threaded as at 40 so as to be coupled to a suitable outlet service pipe or to an inlet service pipe depending upon whether the connector is associated with the inlet spud or the outlet spud of the meter.

In Figures 6 and 7 a modification is disclosed in which the inlet connector 14 and the outlet connector 29 and their associated parts are similar in construction to the form shown in Figure 1, and are arranged to be connected to a tin meter 41 through auxiliary or supplemental elbow connectors 42 and 43, each of which is similarly formed and is threaded at one end as at 44 to receive the internal coupling threads 20 on the lower portion of the adapter 19. The internal flange 22 constitutes a stop for the end 44 of the elbow connector 14 and preferably a gasket 23' is provided to form a tight seal between these parts. The opposite ends of each of the auxiliary tubular connectors 42 and 43 has an enlarged head 45 similar to the head 16 and which fits over an adapter 46, the lower end of which is internally threaded as at 47 to be connected to the external threads 48 of the spud 49 that extends upwardly from the top of the tin meter 41. The outlet spud 50 is similarly connected to the auxiliary connector 43 and these parts are otherwise identical in construction with the connectors and adapters shown in Figure 2. It will be seen that by reason of this type of connector means it is easy to remove a cast iron meter from the supply pipes 13 and 16, and install a tin meter in its place or the connecting means may be efficiently used for initially installing a tin meter 41.

In Figures 8 and 9 a further modification is shown in which a cast iron or tin meter 51 is associated with a tubular connector 52 through an adapter 53 which has an offset or eccentrically positioned threaded opening 54 in the bottom 55 thereof, that is connected to the external threads 56 of the spud 57 on the top of the meter 51. The inner end of the tubular connector 52 is formed with an enlarged head 58 having an opening 58' provided with an annular passage 59. The walls of the opening 58' on opposite sides of the passage 59 engage the outer wall of the adapter 53. The bottom 55 of the adapter is formed adjacent the threaded opening 54 with an internal flange 60 between which and the top of the spud 57 is positioned a gasket 61 so as to form a tight seal when the parts are set up. The bottom 55 of the adapter is also formed with an external annular flange or coupling end 62 which carries a gasket 63 so that when the head 58 of the connector 52 is slipped over the adapter it will rest on the gasket 63. An internally threaded cap 64 is arranged to be connected to external threads 65 on the upper end portion of the adapter 53, and a gasket 66 is positioned between the cap and the head 58 so as to co-act with the gasket 63 in order to provide a tight seal when the connector is clamped onto the adapter by the cap 64. The side wall of the adapter is formed with spaced openings 67 which are arranged to establish communication through the passage 59 of the connector 52 with the interior of the adapter and the spud 57. It will be noted that in this form of the invention, the annular opening 17 (Fig. 2) is omitted and that due to the eccentric connection of the adapter 53 and its associated parts with the spud 57, that all necessary lateral and angular adjustments may be made without providing any space between the outer wall of the adapter and the adjacent wall of the head 58 of the connector. In Figure 9 there is shown in dotted lines various adjustments of the adapter which may be made to lengthen or shorten the connection of the adapter with a service pipe and compensate for inaccuracies in roughing-in the service pipes.

In the modification shown in Figure 10, the connecting means is generally similar to that disclosed in Figure 8, and the tubular connector 68 is provided with a flared opening 69 which communicates with the enlarged tubular head 70 at the inner end of the connector 68. The adapter 71 instead of being eccentrically connected to the spud on the meter, is preferably connected centrally to the spud 72 in substantially the same manner as the spud 56. The circular adapter 71 is formed in the side thereof with spaced openings or ports 73 which communicate with the flared portion 69 of the connector 68. It will be seen that by providing the flared portion 69, it is possible to adjust the connector to almost any angle and still maintain open communication between the interior of the connector 68 and one of the openings 73 in the adapter, and that the annular passage 17 in the adapter shown in Figure 2 may be omitted. Manifestly, if desired, each of the connectors 14 and 29 (Fig. 2) may also be formed with flared portions similar to that shown in Figure 10 for the purpose of maintaining communication of the connector with the adapter irrespective of the adjusted position of the adapter relative to the service pipes.

It will be seen that in all forms of the invention shown and described, the adapter used for connecting the connector with either the inlet or outlet spud of a cast iron meter or a tin meter, is exactly the same for all installations with the exception of variations in the coupling threads on the inner lower wall of the adapter and variations in the head of the connectors, so that a uniform design of adapter and associated coupling means are provided, which with variations only in the internal coupling threads will fit both cast iron and tin meters, and can be used for setting either type of meter in place of the other at a minimum expenditure of time and effort. By providing interchangeable adapters arranged to be associated with the connector and spud threads, the connecting means is particularly adaptable for use to fit cast iron meters having differently threaded internal coupling ends. Due to the fact that cast iron meter threads have not been standardized, this has previously been a serious problem in connecting service pipes to meters, since one manufacturer may have as many as three varying spud threads for the same size spud, while other manufacturers may use the same spuds but provided with differently styled threads. By reason of the use of interchangeable adapters, the service pipes may be readily connected to the spuds of meters irrespective of the varying or different styles of threads on the spuds. The gas company or other distributor will, of course, keep on hand a supply of these interchangeable adapters having a range of spud threads which will take care of any cast iron or tin meter having a nominal or common size spud, but different or varying styles of spud threads, so that the service pipes may be readily and conveniently connected to a cast iron or a tin meter, or for substituting either type of meter in place of the other. In the manufacture of the adapters 19, one set of patterns and core boxes is sufficient to take care of the entire range in a certain nominal spud size, and variations in the internal threads on the lower coupling portion of the adapter can be made by machine so that interchangeable adapters may be readily installed or connected to nominal size spuds of either cast iron or tin meters. Additionally, the connecting means enables the meter to be installed close to the floor since it takes up a limited amount of space, and thus provides a maximum amount of headroom. Moreover, the connecting means permits considerable lateral adjustment so that the service pipes will not have to be sprung to permit the adapters to be properly connected to the spuds of the meter.

It will be understood that the forms of the invention shown and described are merely illustrative of preferred embodiments and that such changes may be made as come within the purview of one skilled in the art and the scope of the following claims.

I claim:

1. Connecting means for gas meters including an externally threaded spud on the meter, a tubular adapter having an external coupling flange and an internally threaded portion on its lower end and an externally threaded portion on its upper end, said internally threaded portion being connected to said spud, a service pipe connector terminating at one end in a head having a vertical opening, the inner wall of said opening being provided with an annular passage, said head fitting over the adapter and supported by said external flange, said adapter adjacent the lower end thereof having an internal flange arranged to engage the top of said spud, an internally threaded cap connected to the external threads of said adapter and arranged to engage said head, said cap co-acting with the external flange on said adapter for clamping the head in a fixed position, and said adapter having a port in the wall thereof registering with said annular passage for communicating the connector with the meter.

2. Connecting means for gas meters including an externally threaded spud on the meter, a tubular adapter having an external flange and an internally threaded portion on its lower end and an externally threaded portion on its upper end, said internally threaded portion being connected to said spud, a service pipe connector terminating at one end in a head having a vertical opening, the inner wall of said opening being provided with an annular passage, the diameter of said opening being larger than the external diameter of said adapter so that the adapter may be laterally adjusted in any direction when the service pipe is inaccurately roughed-in, said head fitting over the adapter and supported by said external flange, a gasket between the external flange and said head, said adapter having an internal flange arranged to engage the top of said spud, a gasket between said internal flange and said spud, an internally threaded cap connected to the external threads of said adapter and arranged to engage said head, a gasket between said cap and said head, said cap co-acting with the external flange on said adapter for clamping the head in a fixed position, and said adapter having a port in the wall thereof registering with said annular passage for communicating the connector with the meter.

3. Connecting means for meters including an externally threaded spud on the meter, a tubular adapter having an external flange, an internally threaded offset portion on its lower end, an externally threaded portion on its upper end, said internally threaded portion being connected to said spud, said adapter adjacent its lower end having an external flange above said external threaded portion arranged to engage the top of said spud, a service pipe connector terminating at one end in a head having a vertical opening, the wall of said opening having an annular passage, said head fitting over the adapter and supported by said external flange, an internally threaded cap connected to the external threads of said adapter and arranged to engage said head, and said adapter having spaced ports in the wall thereof registering with said annular passage, and said adapter being eccentrically mounted relative to the spud to provide a universal lateral adjustment of the connector relative to the meter to compensate for inaccuracies in roughing-in the service pipe.

4. Connecting means for gas meters including an externally threaded spud on the meter, a tubular adapter having an external flange and an internally threaded portion on its lower end and an externally threaded portion on its upper end, said internally threaded portion being connected to said spud, a service pipe connector terminating at one end in a head having a vertical opening, the inner wall of said opening being provided with an annular passage, the diameter of said opening being larger than the external diameter of said adapter so that the adapter may be laterally adjusted in any direction when the service pipe is inaccurately roughed-in, said head fitting over the adapter and supported by said external flange, a gasket between the external flange and said head, said adapter adjacent the lower end thereof having an internal flange arranged to engage the top of said spud, a gasket between said internal flange and said spud, an internally threaded cap connected to the external threads of said adapter and arranged to engage said head, a gasket between said cap and said head, said cap co-acting with the external flange on said adapter for clamping the head in a fixed position, and said adapter having spaced ports in the wall thereof registering with said annular passage for communicating the connector with the meter.

LUCIEN W. MUELLER.

REFERENCES CITED

The following references are of record in the file of this patent:

UNITED STATES PATENTS

| Number | Name | Date |
| --- | --- | --- |
| 1,095,757 | Wentz | May 5, 1914 |
| 1,632,042 | Price | June 14, 1927 |
| 1,725,987 | Kersten | Aug. 27, 1929 |
| 1,851,860 | McKee | Mar. 29, 1932 |

FOREIGN PATENTS

| Number | Country | Date |
| --- | --- | --- |
| 507,838 | Great Britain | June 21, 1939 |